United States Patent
Yamane (10) Patent No.: US 11,305,424 B2
(45) Date of Patent: Apr. 19, 2022

(54) GENERALIZED ADMITTANCE CONTROL FOR ROBOTIC MANIPULATORS

(71) Applicant: Honda Motor Co., Ltd., Tokyo (JP)

(72) Inventor: Katsu Yamane, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 17/000,758

(22) Filed: Aug. 24, 2020

(65) Prior Publication Data

US 2021/0362334 A1 Nov. 25, 2021

Related U.S. Application Data (60) Provisional application No. 63/028,702, filed on May 22, 2020.

(51) Int. Cl.
*B25J 9/16* (2006.01)
*B25J 13/08* (2006.01)
*G05B 19/4155* (2006.01)

(52) U.S. Cl.
CPC .......... *B25J 9/1648* (2013.01); *B25J 9/1664* (2013.01); *B25J 9/1676* (2013.01); *B25J 13/085* (2013.01);
(Continued)

(58) Field of Classification Search
USPC ................................................ 700/245–264
See application file for complete search history.

(56) References Cited

U.S. PATENT DOCUMENTS 7,027,965 B2 * 4/2006 Hannaford ............... G05B 5/01
703/2
7,181,314 B2 * 2/2007 Zhang ..................... B25J 9/1687
414/754
(Continued)

OTHER PUBLICATIONS

Yamane, Admittance Control With Unknown Location of Interaction, 2021, IEEE, Robotics and Automation Letters, vol. 6, No. 2, pp. 4079-4086 (Year: 2021).*
(Continued)

*Primary Examiner* — Jaime Figueroa
(74) *Attorney, Agent, or Firm* — American Honda Motor Co., Inc.; Aaron Fong (57) ABSTRACT

A control system and method for generalized admittance control (AC) is provided. The control system includes circuitry communicatively coupled to a robotic manipulator. The circuitry receives, from a sensor system of the robotic manipulator, contact force measurements associated with a physical interaction of the robotic manipulator with an object. The circuitry determines a surface portion of the robotic manipulator on which the physical interaction with the object occurs and samples a set of interaction points from the surface portion. The circuitry computes a generalized velocity for AC of the robotic manipulator by minimizing a cost function. The cost function includes a relationship between the contact force measurements and an approximation term which models application of an actual contact force of the physical interaction on the sampled set of interaction points. The circuitry generates a set of joint control instructions based on generalized velocity to control motion of the robotic manipulator.

20 Claims, 5 Drawing Sheets

(52) U.S. Cl.
CPC ............... *G05B 19/4155* (2013.01); *G05B 2219/40269* (2013.01); *G05B 2219/49157* (2013.01)

(56) References Cited

U.S. PATENT DOCUMENTS

| | | | | |
|---|---|---|---|---|
| 7,340,323 | B2* | 3/2008 | Zhang | B25J 9/1633 |
| | | | | 414/754 |
| 7,646,161 | B2* | 1/2010 | Albu-Schaffer | A61B 34/76 |
| | | | | 901/41 |
| 7,688,016 | B2* | 3/2010 | Aghili | B25J 9/1605 |
| | | | | 318/632 |
| 8,108,190 | B2* | 1/2012 | Riener | G09B 23/32 |
| | | | | 703/11 |
| 9,308,645 | B2* | 4/2016 | Lecours | B25J 9/163 |
| 9,757,254 | B2* | 9/2017 | Nagarajan | A61F 2/70 |
| 9,849,595 | B2* | 12/2017 | Wang | B25J 13/025 |
| 11,104,007 | B2* | 8/2021 | Koo | G05B 19/423 |
| 2002/0062177 | A1* | 5/2002 | Hannaford | G06F 3/016 |
| | | | | 700/245 |
| 2003/0132726 | A1* | 7/2003 | Dohring | B25J 9/1633 |
| | | | | 318/437 |
| 2004/0254771 | A1* | 12/2004 | Riener | G09B 23/32 |
| | | | | 703/7 |
| 2005/0113971 | A1* | 5/2005 | Zhang | B25J 9/1687 |
| | | | | 700/245 |
| 2007/0073442 | A1* | 3/2007 | Aghili | B25J 9/1605 |
| | | | | 700/245 |
| 2007/0120512 | A1* | 5/2007 | Albu-Schaffer | B25J 9/1643 |
| | | | | 318/568.2 |
| 2013/0253702 | A1* | 9/2013 | Lecours | B25J 9/163 |
| | | | | 700/250 |
| 2015/0051519 | A1* | 2/2015 | Morbi | A61H 1/02 |
| | | | | 601/26 |
| 2015/0342695 | A1* | 12/2015 | He | A61B 34/30 |
| | | | | 606/130 |
| 2018/0079090 | A1* | 3/2018 | Koenig | A61B 34/77 |
| 2019/0201039 | A1* | 7/2019 | Widenhouse | A61B 17/072 |
| 2019/0274719 | A1* | 9/2019 | Stulen | A61B 8/4483 |
| 2019/0358817 | A1* | 11/2019 | Ghazaei Ardakani | |
| | | | | B25J 13/025 |
| 2020/0206943 | A1* | 7/2020 | Koo | G05B 19/423 |
| 2021/0001490 | A1* | 1/2021 | Yamane | B25J 11/008 |
| 2021/0107142 | A1* | 4/2021 | Solowjow | B25J 9/1633 |
| 2021/0197373 | A1* | 7/2021 | Cassero | B25J 9/1607 |

OTHER PUBLICATIONS

Yang et al, Neural Networks Enhanced Adaptive Admittance Control of Optimized Robot-Environment Interaction, 20149, IEEE, Transactions on Cybernetics, vol. 49, No. 7, Jul. 2019, pp. 2568-2579 (Year: 2019).*
Neville Hogan, "Impedance Control: An Approach To Manipulation", American Control Conference IEEE, Jun. 1984, pp. 304-313.
Keemink, et al., "Admittance control for physical human-robot interaction", The International Journal of Robotics Research IJRR, Apr. 2018, pp. 1421-1444, vol. 37, No. 11.
Villani, et al., "Force Control", Springer Handbook of Robotics, 2nd Edition, 2016, pp. 195-219, ch. 9, Springer.
Roy Featherstone, "A Beginner's Guide to 6-D Vectors (Part 1)", IEEE Robotics & Automation Magazine, Sep. 2010, pp. 83-94, vol. 17, No. 3.
Miller, et al., "Comparison of Multi-Sensor Admittance Control in Joint Space and Task Space for a Seven Degree of Freedom Upper Limb Exoskeleton", 3rd IEEE RAS & EMBS International Conference on Biomedical Robotics and Biomechatronics, Sep. 2010, pp. 70-75.
Li, et al., "A passivity based admittance control for stabilizing the compliant humanoid Coman", 12th IEEE-RAS International Conference on Humanoid Robots (Humanoids 2012), Nov.-Dec. 2012, pp. 43-49.
Ko Yamamoto, "Resolved Multiple Viscoelasticity Control for a Humanoid", IEEE Robotics and Automation Letters, Jan. 2018, pp. 44-51, vol. 3, No. 1.
Morinaga, et al., "Collision detection system for manipulator based on adaptive impedance control law", IEEE International Conference on Robotics & Automation (Cat. No. 03CH37422), Sep. 2003, pp. 1080-1085, vol. 1.
Luca, et al., "Sensorless Robot Collision Detection and Hybrid Force/Motion Control", IEEE International Conference on Robotics and Automation, Apr. 2005, pp. 999-1004.
Haddadin, et al., "Robot Collisions: A Survey on Detection, Isolation, and Identification", IEEE Transactions on Robotics, Dec. 2017, pp. 1292-1312, vol. 33, No. 6.
Ebert, et al., "Safe human-robot-cooperation image-based collision detection for industrial robots", IEEE/RSJ International Conference on Intelligent Robots and Systems, Oct. 2002, pp. 1826-1831, vol. 2.
Flacco, et al., "A depth space approach to human-robot collision avoidance", IEEE International Conference on Robotics and Automation, May 2012, pp. 338-345.
Magrini, et al., "Estimation of contact forces using a virtual force sensor", IEEE/RSJ International Conference on Intelligent Robots and Systems, Sep. 2014, pp. 2126-2133.
Magrini, et al., "Control of Generalized Contact Motion and Force in Physical Human-Robot Interaction", IEEE International Conference on Robotics and Automation (ICRA), May 2015, pp. 2298-2304.
Ott, et al., "Base Force/Torque Sensing for Position based Cartesian Impedance Control", IEEE/RSJ International Conference on Intelligent Robots and Systems, Oct. 2009, pp. 3244-3250.
Mittendorfer, et al., "Realizing whole-body tactile interactions with a self-organizing, multi-modal artificial skin on a humanoid robot", Advanced Robotics, Jan. 2015, pp. 51-67, vol. 29, No. 1.
Kaplish, et al., "Motion Retargeting and Control for Teleoperated Physical Human-Robot Interaction", IEEE-RAS 19th International Conference on Humanoid Robots (Humanoids), Oct. 2019, pp. 723-730.
Franka Emika, link: https://www.franka.de/company, Retrieved on Aug. 24, 2020, pp. 1-3.
Yamane, et al., "Natural Motion Animation through Constraining and Deconstraining at Will", IEEE Transactions on Visualization and Computer Graphics, Jul.-Sep. 2003, pp. 352-360, vol. 9, No. 3.

* cited by examiner

GENERALIZED ADMITTANCE CONTROL FOR ROBOTIC MANIPULATORS

CROSS-REFERENCE TO RELATED APPLICATIONS/INCORPORATION BY REFERENCE

This application claims priority to U.S. Provisional Patent Application Ser. No. 63/028,702 filed on May 22, 2020 and titled System for Generalized Admittance Control and Method Thereof, which is hereby incorporated by reference in its entirety.

BACKGROUND

Admittance control (AC) is a method utilized for controlling a motion of a robotic manipulator that physically interacts with the environment or objects, including humans. The goal of AC may be to realize a desired admittance property by computing an appropriate motion command, which may be tracked by a low-level tracking controller. In order to realize the AC, an exact location of physical interaction of the robotic manipulator with the object may be required. However, determination of the exact location of physical interaction is complex and may be inaccurate.

Limitations and disadvantages of conventional and traditional approaches will become apparent to one of skill in the art, through comparison of described systems with some aspects of the present disclosure, as set forth in the remainder of the present disclosure and with reference to the drawings.

SUMMARY

An exemplary aspect of the disclosure provides a control system for generalized admittance control (AC) for robotic manipulators. The control system may include circuitry communicatively coupled to a robotic manipulator that comprises a robotic arm and an effector coupled to the robotic arm. The circuitry may receive, from a sensor system of the robotic manipulator, contact force measurements associated with a physical interaction of the robotic manipulator with an object. The circuitry may determine a surface portion of the robotic manipulator on which the physical interaction with the object occurs. The circuitry may sample a set of interaction points from the surface portion and compute a generalized velocity for an AC of the robotic manipulator by minimizing a cost function. The cost function may include a relationship between the received contact force measurements and an approximation term which models an application of the actual contact force of the physical interaction on the sampled set of interaction points. Based on the generalized velocity, the circuitry may generate a set of joint control instructions to control a motion of the robotic manipulator.

Another exemplary aspect of the disclosure provides a method for generalized AC for robotic manipulators. The method may include receiving contact force measurements associated with a physical interaction of the robotic manipulator with an object. The contact force measurements may be received from a sensor system of a robotic manipulator. The method may further include determining a surface portion of the robotic manipulator on which the physical interaction with the object occurs and sampling a set of interaction points from the surface portion. The method may further include computing a generalized velocity for an AC of the robotic manipulator by minimizing a cost function. The cost function may include a relationship between the received contact force measurements and an approximation term which models an application of the actual contact force of the physical interaction on the sampled set of interaction points. The method may further include generating a set of joint control instructions to control a motion of the robotic manipulator, based on the generalized velocity.

Another exemplary aspect of the disclosure provides a non-transitory computer-readable medium having stored thereon, computer-executable instructions that when executed by a control system, may cause the circuitry to execute operations. The operations may include receiving, from a sensor system of a robotic manipulator, contact force measurements associated with a physical interaction of the robotic manipulator with an object. The robotic manipulator may include a robotic arm and an effector coupled to the robotic arm. The operations may further include determining a surface portion of the robotic manipulator on which the physical interaction with the object occurs and sampling a set of interaction points from the determined surface portion. The operations may further include computing a generalized velocity for an AC of the robotic manipulator by minimizing a cost function. The cost function may include a relationship between the received contact force measurements and an approximation term which models an application of the actual contact force of the physical interaction on the sampled set of interaction points. The operations may further include generating, based on the generalized velocity, a set of joint control instructions to control a motion of the robotic manipulator.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed control system for a generalized admittance control (AC) of robotic manipulators. Generally, control of physical interaction of the robotic manipulator and environment in which the physical interaction takes place is of utmost importance for successful execution of practical tasks performed the robotic manipulator. For example, the practical tasks such as accurate manipulation of an object by an effector of the robotic manipulator may be possible if the physical interaction of the robotic manipulator and the environment is efficiently controlled.

Typically, for control of the robotic manipulator, a model of the robotic manipulator may be known, but a precise model of the environment may be difficult to obtain. Inefficient control of the robotic manipulator may lead to generation of an excessive contact force and a moment, leading to a non-compliant and unsafe interaction with inanimate or animate objects in surrounding environment. One of the methods that may be utilized to achieve a compliant and safe physical interaction of the robotic manipulator with the inanimate or animate objects may be admittance control (AC). AC may be used for compliant and safe physical interaction with the inanimate or animate objects (e.g., human) by moving at least one moveable component of the robotic manipulator away from a contact.

For AC to work effectively, an interaction wrench at which the effector of the robotic manipulator and the object may interact, needs to be represented in a task space (or the environment) where a desired admittance property of the robotic manipulator is defined. The representation of the interaction wrench in the task space where the desired admittance property of the robotic manipulator is defined may be difficult in conventional AC. In an exemplary scenario, it may be difficult to uniquely determine an exact location of interaction of the effector and the object in the task space, even when the robotic manipulator may be equipped with a 6-axis force torque (FT) sensor at the effector, without additional information corresponding to image, depth and tactile.

The disclosed control system relates to the generalized AC for the robotic manipulators. The control system may allow realization of the desired admittance property without a need to represent (or convert) the interaction wrench in the task space. Without an exact location of the physical interaction, the control system may enable selection of a set of interaction points from a surface portion of the robotic manipulator. A set of weight values may be generated by the control system and assigned to the set of interaction points for enhanced accuracy of response at the exact point of interaction of the robotic manipulator and the object. The selected set of interaction points may be used to compute a generalized velocity for an AC of the robotic manipulator. Based on the computation of the generalized velocity for the AC, a set of joint control instructions may be used to the control the motion of the robotic manipulator in the task space. Thus, by use of the sampled set of interaction points, a requirement of the determination of the exact location of the physical interaction of the robotic manipulator with an object may be eliminated.

Reference will now be made in detail to specific aspects or features, examples of which are illustrated in the accompanying drawings. Wherever possible, corresponding, or similar reference numbers will be used throughout the drawings to refer to the same or corresponding parts.

Figure 1:
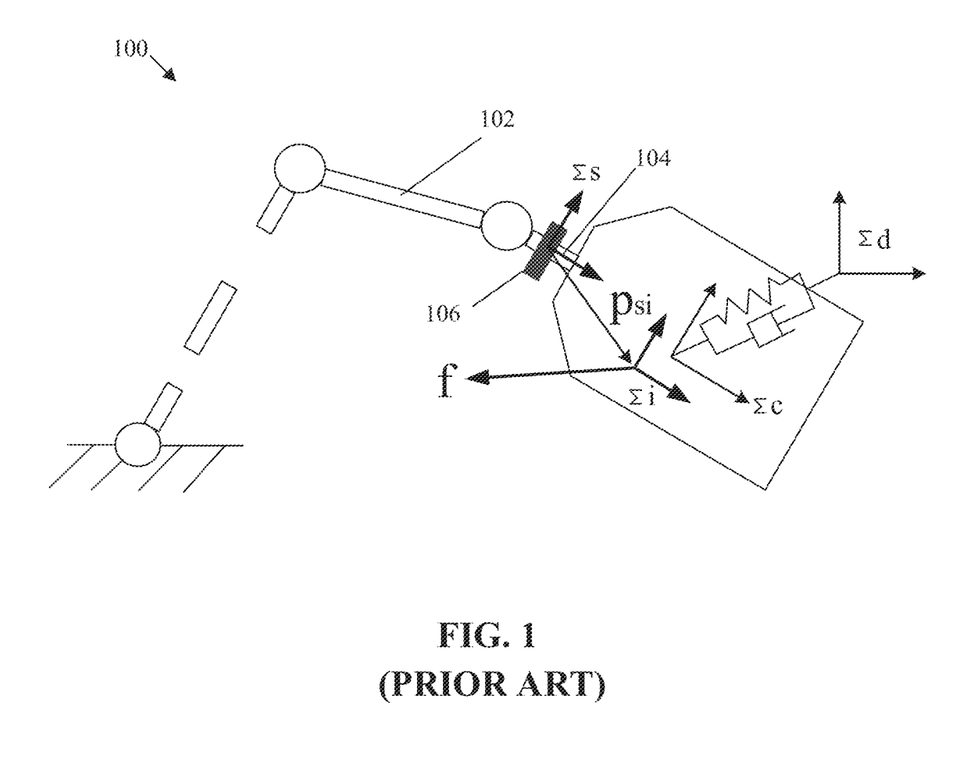
FIG. 1 is a diagram that illustrates a conventional approach for admittance control (AC) of an example robotic manipulator.

FIG. 1 is a diagram that illustrates a conventional approach for AC of an example robotic manipulator. With reference to FIG. 1, there is shown a diagram of a robotic manipulator 100 in an example environment. The robotic manipulator 100 includes a robotic arm 102 and an effector 104 coupled to an end of the robotic arm 102. The effector 104 may be equipped with a force torque (FT) sensor 106. The AC may be required to be applied on the effector 104 of the robotic arm 102 of the robotic manipulator. For application of the AC, two effector fixed frames may be defined, such as an interaction frame $\Sigma i$ and an FT sensor frame $\Sigma s$. The interaction frame $\Sigma i$ may be defined as a frame where an interaction wrench is applied. The FT sensor frame $\Sigma s$ may be defined as a frame where the interaction wrench is measured. The interaction frame $\Sigma i$ and the FT sensor frame $\Sigma s$ may be different from each other as the interaction wrench may be applied anywhere on the effector 104.

The AC may be utilized for realization of a desired admittance property between the interaction wrench and the motion of the interaction frame $\Sigma i$. Therefore, for the realization of the desired admittance property two additional frames may be defined, such as a desired frame $\Sigma d$ and a compliant frame $\Sigma c$. The desired frame $\Sigma d$ may be defined as a frame with which the interaction frame $\Sigma i$ coincides in absence of the interaction wrench. Moreover, the compliant frame $\Sigma c$ may be defined as a frame whose motion with respect to the desired frame $\Sigma d$ determines the admittance wrench. Further, for interaction frame $\Sigma i$ to track the compliant frame $\Sigma c$ for AC of the robotic manipulator, inverse kinematics computation and a joint tracking controller may be used.

The desired admittance property may be represented as the spring-damper system as shown in FIG. 1. It may be assumed that a high gain tracking controller may allow the interaction frame $\Sigma i$ to track the compliant frame $\Sigma c$ perfectly. Thus, the desired admittance property may be defined as:

$$w = K_d(v_c - v_d) + K_p \Delta p_{dc} \quad (1)$$

where $K_p \in R^{6 \times 6}$ and $K_d \in R^{6 \times 6}$ are positive-definite matrices, $v_c \in R^6$ and $v_d \in R^6$ are twists of the compliant frame $\Sigma c$ and the desired frame $\Sigma d$ respectively. Moreover, $\Delta p_{dc} \in R^6$ represents a position and an orientation difference between the desired frame $\Sigma d$ and the compliant frame $\Sigma c$.

In order to control the robotic manipulator, $v_c$ may be computed by using equation 1 as:

$$v_c = k_d^{-1} K_d^{-1}(w - K_p \Delta p_{dc}) + v_d \quad (2)$$

Equation 2 may be integrated to obtain the position and the orientation of the compliant frame $\Sigma c$. Furthermore, an inverse kinematics algorithm may be applied to update joint position commands corresponding to joints of the robotic arm 102. The updated joint position commands may be tracked by a low-level tracking controller.

The traditional AC method possesses several disadvantages. One of the problems associated with the traditional AC method is that the desired admittance property of the equation 1 may require the interaction wrench "w" and the twist $v_c$ to be represented in a same space, (such as force-motion dual vector spaces). However, the representation of the interaction wrench "w" and the twist $v_c$ in the same space may not be possible without additional information of the exact location of the interaction of the object with the robotic manipulator, even when the FT sensor 106 may be employed.

In an exemplary scenario, a pure force f may be applied at the interaction frame $\Sigma i$ with a nonzero offset value of $p_{si}$ from the sensor frame $\Sigma s$, where the nonzero offset value of $p_{si}$ represents the position and the orientation difference between the sensor frame $\Sigma s$ and the interaction frame $\Sigma i$. Since a torque component of the interaction wrench "w" around the interaction frame $\Sigma i$ is zero, a rotational component of $\Delta p_{dc}$ must be zero at a steady state, such that the twists $v_c = v_d = 0$ in accordance with the equation 1. On the other hand, the interaction wrench "w" measured at the sensor frame Σs may have a nonzero torque component (i.e. $p_{si} \times f$). Moreover, by applying equation 1 to the force measured at the sensor frame Σs to compute the twist $v_c$, the compliant frame Σc may rotate with respect to the desired frame Σd, thereby, resulting in an undesired response not only in rotation but also in translation due to an additional linear motion caused by the rotation of the compliant frame Σc with respect to the desired frame Σd. Therefore, in order to realize the desired admittance property, the interaction wrench "w" measured at the sensor frame Σs must be converted to the interaction frame Σi, which may require the term $p_{si}$.

Another problem faced by the traditional AC method is that the robotic manipulator may not be able to react to the interaction wrenches applied to links above the FT sensor 106 in a tree structure of the robotic manipulator. Such a problem may be faced by the robotic manipulator when the robotic manipulator moves in close proximity to humans. When the robotic manipulator moves closer to humans, the robotic arm may experience collisions and contacts anywhere on its body (such as the robotic arm 102). An incorrect detection of the exact location of contact (such as collisions on the body of the robotic manipulator) may result into an inaccurate application of the AC on the robotic manipulator. Therefore, a reaction of the robotic manipulator due to the inaccurate application of the AC may be inefficient, thereby creating an unsafe working environment.

The control system of the present disclosure may overcome the problems mentioned in the foregoing description by eliminating a need of conversion of the interaction wrench "w" in the task space, thereby eliminating a need of application of the inverse kinematics algorithm as explained in the subsequent figures. The control system of the present disclosure may allow AC for the robotic manipulators by utilization of the weighted set of interaction points, without a need of determination of the exact location of interaction of the robotic manipulator and the object. Thus, a need of additional sensors, such as an image sensor, a depth sensor, or a tactile sensor at various locations on the robotic manipulator for the determination of the exact location of interaction may be eliminated.

Figure 2:
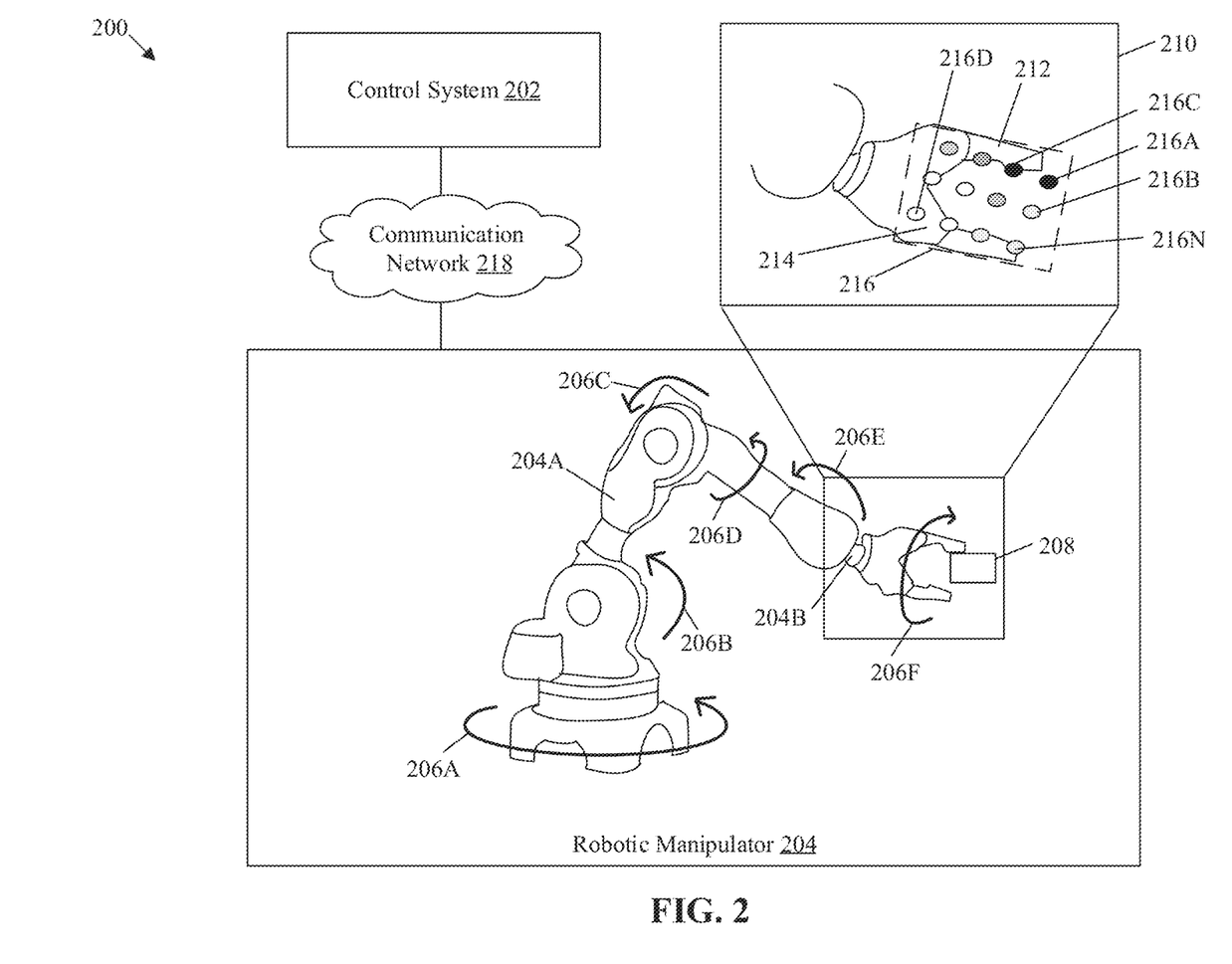
FIG. 2 is a diagram that illustrates an exemplary environment for a generalized AC of a robotic manipulator, in accordance with an embodiment of the disclosure.

FIG. 2 is a diagram that illustrates an exemplary environment for a generalized AC of a robotic manipulator, in accordance with an embodiment of the disclosure. With reference to FIG. 2, there is shown a diagram of an exemplary environment 200. The exemplary environment 200 may include a control system 202 and a robotic manipulator 204. The robotic manipulator 204 may include a robotic arm 204A and an effector 204B coupled to the robotic arm 204A.

The exemplary environment 200 may further include an object 208. In FIG. 2, the depiction of the object 208 as a square block is merely illustrated as an example and should not be construed as limiting for the present disclosure. The present disclosure may be applicable to other inanimate objects or animate objects (such as a human-robot interaction), without a deviation from the scope of the present disclosure. An expanded view 210 of a physical interaction between the object 208 and a gripping portion 212 of the effector 204B is also shown. The expanded view 210 includes a set of interaction points 216 which may be sampled, for example, from a surface portion 214 of the effector 204B. The set of interaction points 216 may include a first interaction point 216A, a second interaction point 216B, a third interaction point 216C, a fourth interaction point 216D and an Nth interaction point 216N. There is further shown a communication network 218 through which the control system 202 may be communicate with the robotic manipulator 204.

The control system 202 may include suitable logic, circuitry, interfaces, and/or code that may be configured to execute one or more operations for a generalized AC of the robotic manipulator 204. For example, the control system 202 may compute a generalized velocity for an AC of the robotic manipulator 204 and may generate a set of joint control instructions based on the computed generalized velocity to control a motion of the robotic manipulator 204. Example implementations of the control system 202 may include, but are not limited to, a human-machine interface (HMI), a smartphone, a cellular phone, a mobile phone, a gaming device, a wearable electronic device, a head-mounted device, a mainframe machine, a server, a computer work-station, an industrial control system (such as a Programmable Logic Controller (PLC), a supervisory control and data acquisition (SCADA) system, or a distributed control system (DCS)), or any computing device with a capability of tracking and controlling a spatial motion of the robotic manipulator 204.

The robotic manipulator 204 may be a device that may be configured to execute different operations, such as, pick, hold, grab, transfer, sort, put away, or reverse put different objects. The robotic manipulator 204 may include the robotic arm 204A coupled to the effector 204B. The robotic manipulator 204 may include a sequence of rigid links and joints that may be utilized to perform a specific operation, for example, for a manipulation of objects in a task space. For example, the robotic manipulator 204 may be employed to pick up and put down an object, such as the object 208, slide the object on a surface, and so forth.

The robotic arm 204A may be, for example, a mechanical arm with revolute joints that allow the robotic arm 204A to have several degrees of freedom. In an embodiment, the robotic arm 204A may include different functional portions (e.g., arms), movement of which may be maneuvered by a plurality of joint actuators to guide the effector 204B in 3D space. The movement of the robotic arm 204A in 3D space may be restricted by a defined number of degrees of freedom of different functional portions of the robotic arm 204A. The motion of the robotic arm 204A may be programmatically controlled based on machine instructions or control signals from a joint controller, such as a Proportional-Integral-Derivative (PID) controller of the robotic manipulator 204. In an embodiment, the joint controller may be communicatively coupled to the control system 202. In another embodiment, the joint controller may be a part of the control system 202.

In FIG. 2, the robotic manipulator 204 is shown to be a jointed-arm robot with revolute joints that allow the robotic manipulator 204 to have six degrees of freedom 206A, 206B, 206C, 206D, 206E, and 206F. However, the present disclosure may not be limited to the implementation of the robotic manipulator 204 as a jointed-arm robot with six degrees of freedom. In some embodiment, the robotic manipulator 204 may be any articulated robot with any degrees of freedom.

The effector 204B may be a device coupled to the robotic arm 204A and may be configured to interact with the environment to manipulate the object 208. In FIG. 2, for example, the effector 204B is shown as an end-effector coupled to an end of the robotic arm 204A. However, the present disclosure may not be so limiting and in some embodiments, the effector 204B may be coupled to any portion of the robotic arm 204A, such as to a middle portion of the robotic arm 204A.

In an embodiment, the effector 204B may be a tool, an assembly, or an apparatus that may be removably attached to one or more free joints on the robotic arm 204A. The effector 204B may be configured to operate by use of pneumatic systems, hydraulic systems, or electromechanical systems to physically interact with objects. For example, such interaction may include a pickup maneuver, a holding or grabbing maneuver, a sliding maneuver, a throwing maneuver, a pressing action, a shrinking action, or other contact-based maneuvers. Examples of the effector 204B may include, but are not limited to, a robotic-gripper (such as an electric grippers, a vacuum-based gripper (such as a suction cup), a pneumatic gripper, or a magnetic gripper), a collision sensor, a tool changer, or a robotic hand with fingers.

The communication network 218 may include a communication medium through which the control system 202 and the robotic manipulator 204 may communicate with each other. The communication network 218 may be one of a wired connection or a wireless connection. Examples of the communication network 218 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the exemplary environment 200 may be configured to connect to the communication network 218 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 3:
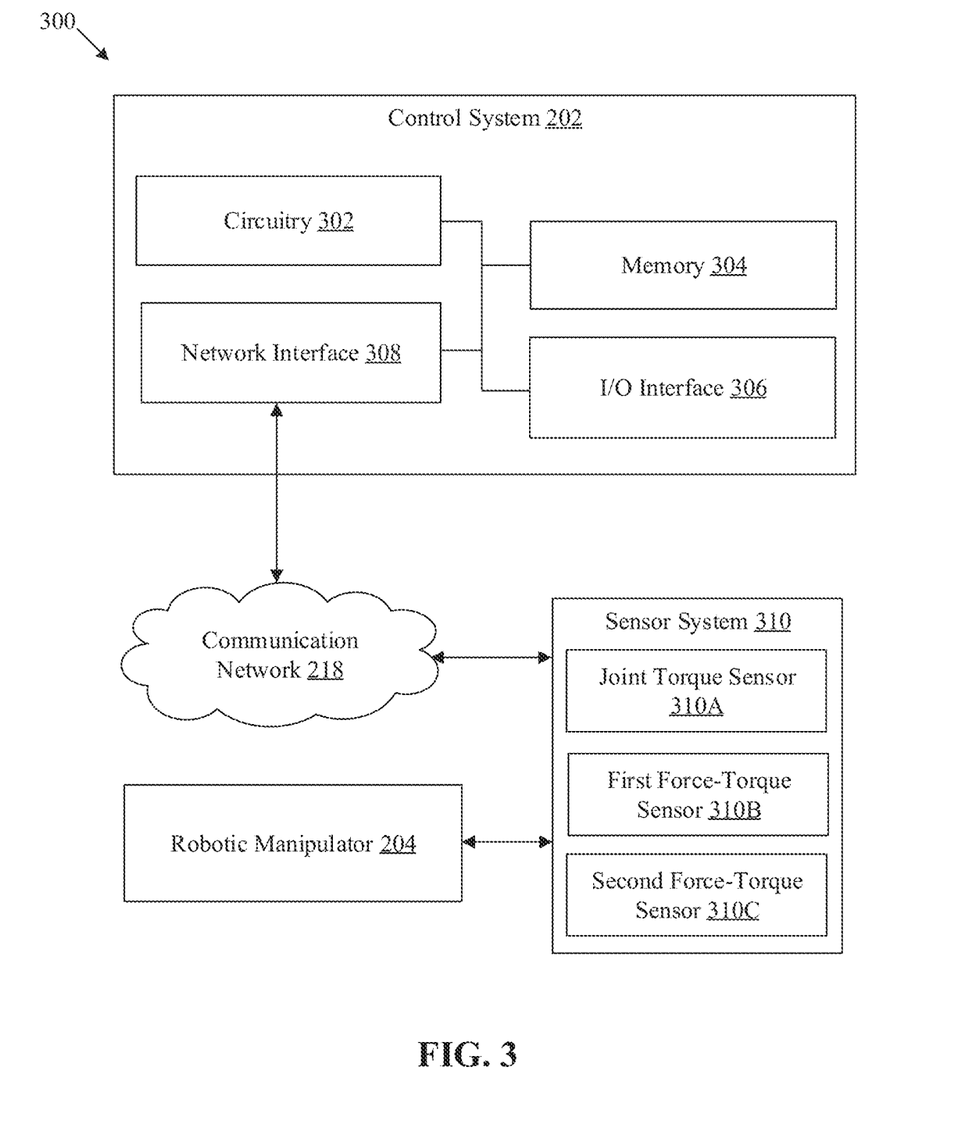
FIG. 3 is a block diagram of an exemplary control system for a generalized AC of a robotic manipulator, in accordance with an embodiment of the disclosure.

In operation, the control system 202 may be configured to receive contact force measurements associated with a physical interaction of the robotic manipulator 204 with an object, such as the object 208. The contact force measurements may be received from a sensor system (as shown in FIG. 3) of the robotic manipulator 204. The contact force measurements may include measurements corresponding to an actual contact force or a contact wrench applied at the location of the physical interaction between the robotic manipulator 204 and the object 208.

As shown, for example, the object 208 physically interacts with a jaw of a gripper (an example implementation of the effector 204B). The contact force measurements associated with such physical interaction may be measured, for example, by a force-torque sensor on the wrist of the robotic arm 204A. In such a case, the contact force measurements may include three translational force components and three torque components. The location of the physical interaction in FIG. 2 is merely provided as an example and should not be construed as limiting for the present disclosure. The present disclosure may be applicable to any suitable location of the physical interaction on the body of the robotic manipulator 204.

In order to achieve a desired AC of the robotic manipulator 204 after the physical interaction takes place, the motion of the robotic manipulator 204 may have to be carefully controlled to achieve a desired admittance property between the motion of the robotic manipulator 204 and the actual contact force or the contact wrench of the physical interaction. As the exact location of the physical interaction is unknown, the control system 202 may determine a surface portion 214 of the robotic manipulator 204 on which the physical interaction with the object 208 occurs. The surface portion 214 may be, for example, a portion of the effector 204B with which the object 208 interacts with. It should be noted that the exact location of the physical interaction on the surface portion 214 may not be determined as no image sensors or depth sensors are used to acquire imaging information of the physical interaction.

The control system 202 may sample a set of interaction points 216 from the determined surface portion 214 of the robotic manipulator 204. The sampled set of interaction points 216 may be a set of locations on the surface portion 214 on which the actual contact force of the physical interaction may be assumed to be applied as a result of the physical interaction of the robotic manipulator 204 with the object 208. Thereafter, the control system 202 may compute a generalized velocity for an AC of the robotic manipulator 204. The generalized velocity may be computed in terms of a vector, which may be used to generate joint control instructions to control the motion of the robotic manipulator 204 at discrete time-steps.

The generalized velocity may be computed by minimization of a cost function. The cost function may include a relationship between the received contact force measurements and an approximation term which models an application of the actual contact force of the physical interaction on the sampled set of interaction points 216. Details associated with the minimization of the cost function are provided, for example, in FIG. 4.

In an embodiment, to minimize the cost function, the approximation term may determine an ability of each of the set of interaction points 216 to generate a measured wrench (i.e. the received contact force measurements) at the surface portion 214 of the robotic manipulator 204. The approximation term may include expected force values for each interaction point, modelling as if the physical interaction occurs at the respective interaction point.

In an embodiment, the cost function may also include a set of weight values which may have to be computed for each of the set of interaction points 216. For example, the control system 202 may assign a weight value to each interaction point of the set of interaction points 216 based on a proximity of a respective interaction point with the location of the physical interaction. For example, a first weight value for a first interaction point 216A may be higher than a second weight value for a second interaction point 216B if the first interaction point 216A is closer to the location of the physical interaction than the second interaction point 216B. The computation of the set of weight values for the sampled set of interaction points 216 is explained in detail, for example, in FIG. 4.

The control system 202 may generate a set of joint control instructions to control the motion of the robotic manipulator 204 based on the generalized velocity. The set of joint control instructions may be communicated to a controller of one or more joint actuators of the robotic manipulator 204. The controller, for example, a PID controller may generate control signals for the one or more joint actuators to control the motion of the robotic manipulator 204. The generation of the set of joint control instructions is explained in detail, for example, in FIG. 4.

Based on the set of joint control instructions, the AC may be suitably applied to the robotic manipulator 204 without a need to determine the exact location of the physical interaction on the robotic manipulator 204. Such control may thus enable a safe working environment for the robotic manipulator 204 and other objects or actors, especially humans who work close to the robotic manipulator 204 or whose work requires them to interact with the robotic manipulator 204.

FIG. 3 is a block diagram of an exemplary control system for a generalized AC of a robotic manipulator, in accordance with an embodiment of the disclosure. FIG. 3 is explained in conjunction with elements from FIG. 2. With reference to FIG. 3, there is shown a block diagram 300 of the control system 202. The control system 202 may include circuitry 302, a memory 304, an Input/output (I/O) interface 306, and a network interface 308. The control system 202 may be communicatively coupled with the robotic manipulator 204, via the communication network 218. In some embodiments, the robotic manipulator 204 may include a sensor system 310 which may be communicatively coupled to the control system 202.

The circuitry 302 may include suitable logic, circuitry, and interfaces that may be configured to execute program instructions associated with different operations to be executed by the control system 202. For example, some of the operations may include computation of the generalized velocity for an AC of the robotic manipulator 204 and a generation of a set of joint control instructions to control the motion of the robotic manipulator 204 based on the generalized velocity. The circuitry 302 may include one or more specialized processing units, which may be implemented as an integrated processor or a cluster of processors that perform the functions of the one or more specialized processing units, collectively.

Illustrated as a single circuitry in FIG. 3, the circuitry 302 may include any number of processors configured to, individually or collectively, perform or direct performance of any number of operations of the control system 202, as described in the present disclosure. Additionally, one or more of the processors may be present on one or more control systems. In some embodiments, the circuitry 302 may be configured to interpret and/or execute program instructions and/or process data stored in the memory 304 and/or a persistent data storage (not shown). In some embodiments, the circuitry 302 may fetch program instructions from a persistent data storage and load the program instructions in the memory 304. After the program instructions are loaded into the memory 304, the circuitry 302 may execute the program instructions.

The circuitry 302 may be implemented based on a number of processor technologies known in the art. Some of the example implementations of the circuitry 302 may include, but are not limited to, a Central Processing Unit (CPU), a Reduced Instruction Set Computer (RISC) processor, an Application-Specific Integrated Circuit (ASIC) processor, a Complex Instruction Set Computer (CISC) processor, a Graphical Processing Unit (GPU), a co-processor, and/or a combination thereof.

The memory 304 may include suitable logic, circuitry, interfaces, and/or code that may be configured to store the program instructions executable by the circuitry 302. The memory 304 may be configured to store information, such as an initial set of generalized coordinates of the robotic manipulator 204 and an update of the initial set of generalized coordinates of the robotic manipulator 204. In certain embodiments, the memory 304 may be configured to store operating systems and associated application-specific information. The memory 304 may include computer-readable storage media for carrying or having computer-executable instructions or data structures stored thereon. Such computer-readable storage media may include any available media that may be accessed by a general-purpose or a special-purpose computer, such as the circuitry 302. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 302 to perform a certain operation or a group of operations associated with the control system 202.

The I/O interface 306 may include suitable logic, circuitry, and interfaces that may be configured to receive a user input and provide an output based on the received input. The I/O interface 306 may support various input and output devices to communicate with the circuitry 302. In an embodiment, the circuitry 302 of the control system 202 may communicate with the robotic manipulator 204, via the I/O interface 306. Examples of the I/O interface 306 may include, but are not limited to, serial ports, such as a Universal Serial Bus (USB) based port, parallel ports, ethernet ports, and display ports, The network interface 308 may include suitable logic, circuitry, interfaces, and/or code that may facilitate a communication among various devices, such as the control system 202 and the sensor system 310 of the robotic manipulator 204. In an embodiment, the circuitry 302 may be configured to communicate with controllers, such as a PID controller for actuation of the robotic manipulator 204, via the network interface 308. The network interface 308 may implement known technologies to support wired and/or wireless communication via a wireless communication network. The network interface 308 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 308 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n, 802.11p), voice over Internet Protocol (VoIP), Wi-MAX, a protocol for email, instant messaging, and/or Short Message Service (SMS).

The sensor system 310 may include suitable logic, circuitry, code, and/or interfaces that may be configured to acquire the contact force measurements associated with the physical interaction of the robotic manipulator 204 with the object 208. In an embodiment, the sensor system 310 may include one or more of a joint torque sensor 310A coupled to each joint of a plurality of joints of the robotic arm 204A, a first force-torque sensor 310B coupled to the effector 204B, a second force-torque sensor 310C coupled to a base of the robotic manipulator 204, and a tactile sensor.

Figure 4:
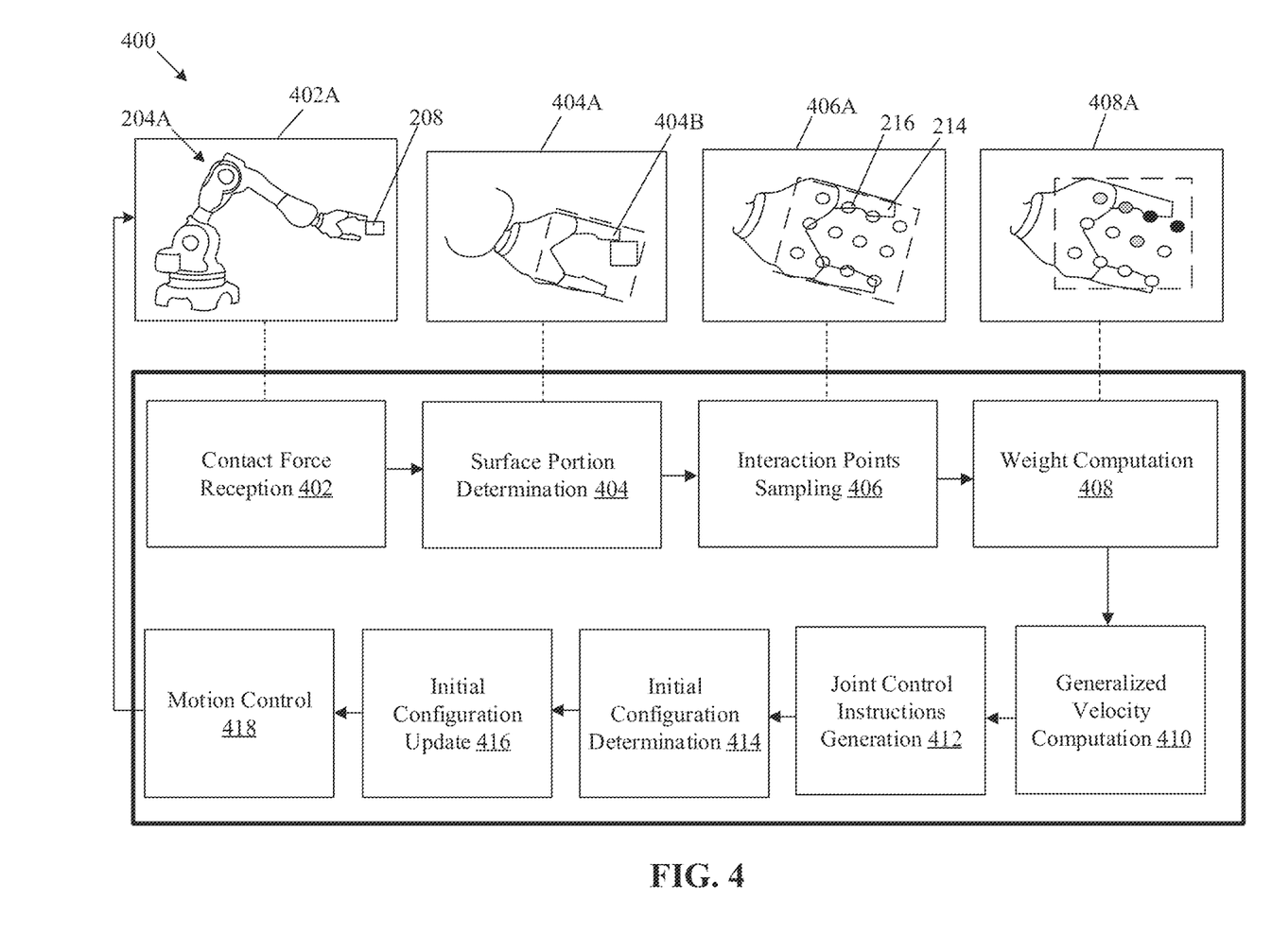
FIG. 4 is a diagram that illustrates exemplary operations for a generalized AC of a robotic manipulator, in accordance with an embodiment of the disclosure.

The functions or operations executed by the control system 202, as described in FIG. 2 and FIG. 4, may be performed by the circuitry 302. Operations executed by the circuitry 302 are described in detail, for example, in FIG. 4.

FIG. 4 is a diagram that illustrates exemplary operations for a generalized AC of a robotic manipulator, in accordance with an embodiment of the disclosure. FIG. 4 is explained in conjunction with elements from FIG. 1, FIG. 2, and FIG. 3. With reference to FIG. 4, there is shown a diagram 400 to depict exemplary operations from 402 to 418. The exemplary operations illustrated in the diagram 400 may start at 402 and may be performed by any computing system, apparatus, or device, such as by the control system 202 of FIG. 2 or the circuitry 302 of FIG. 3.

At 402, contact force measurements may be received from the sensor system 310 of the robotic manipulator 204. In accordance with an embodiment, the circuitry 302 of the control system 202 may be configured to receive the contact force measurements associated with a physical interaction (as shown in a view 402A) of the robotic manipulator 204 with an object, such as the object 208.

In some embodiments, the sensor system 310 may include the joint torque sensor 310A coupled to each joint of the plurality of joints of the robotic arm 204A. The joint torque sensor 310A may be utilized to acquire a set of joint torque measurements (such as a joint torque at each joint of the robotic manipulator 204). The joint torque sensor 310A may enable detection of a collision or a contact of the object 208 on any location on the body of the robotic manipulator 204. In these or other embodiments, the sensor system 310 may further include the first force-torque sensor 3106 coupled to the effector 204B. The first force-torque sensor 310B may be utilized to determine a first set of force-torque measurements on any location on the surface of the effector 204B. For example, if the object 208 collides with one of the jaws of a gripper, the first force-torque sensor 3106 on a wrist of the gripper or the robotic arm 204A may enable a detection of force components and torque components due to the physical interaction (i.e. the collision) of the object 208 with one of the jaws of the gripper. In these or other embodiments, the sensor system 310 may further include a second force-torque sensor 310C coupled to the base of the robotic manipulator 204. The second force-torque sensor 310C may be utilized to determine a second set of force-torque measurements at the base of the robotic manipulator 204. In one or more embodiments, the received contact force measurements may include one or more of: the set of joint torque measurements, the first set of force-torque measurements, or the second set of force-torque measurements.

At 404, a surface portion (as shown in a view 404A) of the robotic manipulator 204 on which the physical interaction with the object 208 occurs may be determined. In accordance with an embodiment, the circuitry 302 may be configured to determine a surface portion of the robotic manipulator 204 on which the physical interaction with the object 208 occurs. The surface portion of the robotic manipulator 204 may be, for example, a portion 404B of the effector 204B where the physical interaction with the object 208 takes place. In some embodiments, the surface portion may belong to any other portion on the robotic arm 204A, such as in case of collision of an object (such as the object 208) with the body of the robotic manipulator 204.

At 406, a set of interaction points may be sampled from the determined surface portion. In accordance with an embodiment, the circuitry 302 of the control system 202 may be configured to sample the set of interaction points 216 from the determined surface portion on the robotic manipulator 204. An example of the set of interaction points 216 on jaws of the gripper are shown in a view 406A.

In one or more embodiments, the set of interaction points 216 may be sampled based on at least one of: a type of physical interaction of the object 208 with the robotic manipulator 204. The type of physical interaction of the object 208 with the robotic manipulator 204 may be a collision, such as an inelastic collision or an elastic collision. As an example, a moving object may collide with the robotic manipulator 204. The collision may be an inelastically collision near a force-torque (FT) sensor and on the effector 204B of the robotic manipulator 204. Alternatively, the collision may be an inelastic collision with one of several jointed arms of the robotic manipulator 204. As another example, a stationary obstacle may collide with the robotic arm 204A while the robotic arm 204A is moving. The type of physical interaction of the object 208 with the robotic manipulator 204 may affect the force and the toque at the location of the physical interaction.

In these or other embodiments, the set of interaction points 216 may be sampled based on a geometry of the object 208. The geometry of the object 208 may affect the contact force measurements. For example, the physical interaction of a cylindrical arm of the robotic manipulator 204 with a spherical object may result in a different contact force with different contact force measurements.

In these or other embodiments, the set of interaction points 216 may be sampled based on a geometry of the surface portion of the robotic manipulator 204. The geometry of the surface portion of the robotic manipulator 204 may vary. As an example, the surface portion may be claw shaped for holding the object 208. As another example, the surface portion may be determined from a curved portion of a forearm link in case an object collides with the forearm link of the robotic arm 204A.

In these or other embodiments, the set of interactions points 216 may be sampled based on a user input. The user input may specify a number of interaction points to be sampled from the surface portion.

The sampled set of interactions points 216 on the surface portion may vary in number or density based on at least one of a type of the physical interaction of the object 208 with the robotic manipulator 204, a geometry of the object 208, a geometry of the surface portion of the robotic manipulator 204, or a user input. For example, if a collision occurs between a forearm link of the robotic arm 204A and a cylinder-shaped obstacle fixed in space, then the circuitry 302 may sample 8 interaction points based on a shape of the forearm link. Whereas, in some cases, 4 interaction points in a 2×2 grid may be sampled from the surface portion. An Increase in the density of interaction points on the surface portion may improve a convergence rate of finding a generalized velocity (as part of application of a desired AC) of the robotic manipulator 204.

In FIG. 4, the determination of the surface portion at 404 and the sampling of the set of interaction points 216 at 406 are performed online (i.e. while the generalized admittance control is implemented after the contact force measurements are received at 402). However, the disclosure may not be so limiting and in some embodiments, the determination of the surface portion at 404 and the sampling of the set of interaction points 216 at 406 may be performed offline (i.e., before the generalized admittance control is applied and the contact force measurements are received at 402. This may be done because surface or shape information of the robotic manipulator 204 may be known to the control system 202 in advance.

At 408, a set of weight values may be computed. In accordance with an embodiment, the circuitry 302 of the control system 202 may be configured to compute the set of weight values for the set of interaction points 216. As an example, the computed set of weight values is depicted in a view 408A with different shades of black and white to depict differences in strengths of the computed set of weight values.

In an embodiment, the circuitry 302 may be configured to compute a force value of interaction at each interaction point of the set of interaction points 216. The force value of interaction may be computed by minimization of an error with the received contact force measurements. For example, the force value of interaction may be computed at the first interaction point 216A by minimization of an error with the received contact force measurements. A weight value may be computed for each interaction point based on the minimized error. As an example, a first weight value may be computed for the first interaction point 216A based on the force value of interaction computed at the first interaction point 216A. Similarly, a second weight value may be computed for the second interaction point 216B based on the force value of interaction computed at the second interaction point 216B.

For example, the force value of interaction ($f_k$) at each of the set of interaction points 216 may be expressed by equation (3), as follows:

$$f_k = (S_{Fk}^T)^+ u \quad (3)$$

where ($S_{Fk}^T$) may denote columns corresponding to a force component of a mapping matrix $S_k^T$ at a $k_{th}$ interaction point of the set of interaction points 216. Details of the mapping matrix $S_k^T$ are further provided at 410. "u" may correspond to the received contact force measurements of 402 (i.e. the measured wrench).

The circuitry 302 may map the force value of interaction ($f_k$) to a measurement space of the physical interaction to compute the error ($\Delta u_k$). The computation of the error ($\Delta u_k$) is expressed by equation (4), as follows:

$$\Delta u_k = u - S_{Fk}^T f_k \quad (4)$$

Using equation (3) and equation (4), the weight value for a $k_{th}$ interaction point may be computed from equation (5), as follows:

$$w_k = \exp(-c \Delta u_k^T \Delta u_k) \quad (5)$$

where $w_k$ is the weight value at the $K_{th}$ interaction point, c is a user-defined constant and $\Delta u_k$ may be the error computed using equation (4) at the $k_{th}$ interaction point of the set of interaction points 216.

In accordance with an embodiment, the first weight value of the set of weight values may indicate a likelihood that the first interaction point 216A of the set of interaction points 216 is proximal to the location of the physical interaction on the robotic manipulator 204. The first weight value for the first interaction point 216A may be higher than the second weight value for the second interaction point 216B if the first interaction point 216A is closer to the location of the physical interaction.

If the first interaction point 216A is closer to the location of the physical interaction than the second interaction point 216B, the first interaction point 216A may generate less error ($\Delta u_k$) as compared to the second interaction point 216B. Therefore, the computed first weight value may be more than the computed second weight value. If the first weight value is more than the second weight value, there may be a greater likelihood of existence of the location of the physical interaction near the first interaction point 216A than the second interaction point 216B.

The computed set of weights values at 408 may be referred to as adaptive weight values. In accordance with an embodiment, the circuitry 302 may determine the set of weight values as a set of uniform weight values, such as $1/w_k$, where k may represent the $k_{th}$ interaction point of the sampled set of interaction points 216. In accordance with another embodiment, the circuitry 302 may determine the set of weight values based on a user input.

At 410, a generalized velocity for an AC of the robotic manipulator 204 may be computed. In accordance with an embodiment, the circuitry 302 of the control system 202 may be configured to compute the generalized velocity by minimization of a cost function. The cost function may include a relationship between the received contact force measurements and an approximation term which may model an application of the actual contact force of the physical interaction on the sampled set of interaction points 216. In some embodiments, the relationship between the received contact force measurements and the approximation term may correspond to a weighted sum-of-squared-difference (WSSD) between the received contact force measurements and the approximation term. For example, the cost function (z) may be represented by an equation (6), as follows:

$$z = \sum_k^K \frac{w_k}{2}(u - u_k)^T(u - u_k) + \frac{1}{2}\dot{q}^T W \dot{q} \quad (6)$$

where,
$w_k$ (computed from equation (5) at 408) may represent the set of weight values for the sampled set of interaction points 216,
$W \in R^{n \times n}$ are user-defined weights,
u may represent the contact force measurements,
$u_k \in R^m$ may represent the approximation term which includes expected force values of the physical interaction at the $k_{th}$ interaction point of the set of interaction points 216,
$\dot{q}$ may represent the generalized velocity to be used to achieve a desired admittance property between the motion of the robotic manipulator 204 and the received contact force measurements (u). The generalized velocity ($\dot{q}$) may be a vector which may determine a rate at which an initial set of generalized coordinates (q, $q \in R^n$) (i.e. an initial robot configuration) of the robotic manipulator 204 may be updated to achieve the desired admittance property, and
T may represent a transpose(•) operator.

In an embodiment, the cost function of equation (6) may be minimized by use of quadratic programming with an analytical solution. Additionally, or alternatively, the cost function of equation (6) may be minimized based on use of any quadratic programming library to, for example, impose joint velocity limits on the cost function. The cost function (such as the cost function of equation (6)) may be minimized further based on the computed set of weight values ($w_k$).

From equation (6), the relationship between the contact force measurements (u) and the approximation term ($u_k$) may be given by a WSSD in equation (7), as follows:

$$\sum_{k}^{K} \frac{w_k}{2} (u - u_k)^T (u - u_k), \text{ or} \quad (7)$$

$$\sum_{k}^{K} \frac{w_k}{2} \|u - u_k\|^2$$

In equation (6) and equation (7), the approximation term ($u_k$) may be computed using equation (8), as follows:

$$u_k = \widehat{K_{Dk}} \dot{q} + u_{bk} \quad (8)$$

Where, $\widehat{K_{Dk}}$ may be a matrix which may be computed by using equation (13), and $u_{bk}$ may be computed by using equation (14), as if the physical interaction is taking place at the $k_{th}$ interaction point instead of the exact location of the physical interaction. In equation (6), the term $\frac{1}{2} \dot{q}^T W \dot{q}$ may be a regularization term that may be added to address the issue of rank deficiency of the matrix $\widehat{K_{Dk}}$. In accordance with an embodiment, other terms may also be included in the cost function for additional tasks. For example, another term may be included in the cost function of equation (6) if the robot configuration is required to be as similar as possible to a given reference, in addition to the desired admittance behavior.

Equation (8) may be derived from a generalized equation ($u = \widehat{K_D} \dot{q} + u_b$) which may represent the relationship between the measured interaction wrench (such as the contact force measurements (u)) and the generalized velocity ($\dot{q}$) that produces the desired admittance property in the effector task space. An example derivation of the generalized equation ($u = \widehat{K_D} \dot{q} + u_b$) is provided, herein.

For mapping of the admittance property, "n" may be defined as the degrees of freedom of the robotic manipulator 204. For example, the degrees of freedom may be the six degrees of freedom 206A, 206B, 206C, 206D, 206E, and 206F. Also, "m" may be defined as a number of measurements to detect the interaction wrench "w". In some embodiments, "m" may be 6 in case the FT sensor is used in the robotic manipulator 204 and "m" may be equal to "n" if the joint torque sensors are used in the robotic manipulator 204. The mapping matrix $S^T \in R^{m \times n}$ may be a configuration-dependent matrix. The mapping matrix $S^T \in R^{m \times n}$ may map the interaction wrench "w" to the contact force measurements "u", as depicted in equation (9):

$$u = S^T w \quad (9)$$

The generalized coordinates "q" may represent the robot configuration, such as $q \in R^n$. The generalized coordinates "q" may uniquely determine the robot configuration. A forward kinematics function f(*) may be used to map the generalized coordinates "q" to $p^i$, where $p^i$ may depict the position and the orientation of the interaction frame $\Sigma i$. $p^i$ may be expressed using equation (10), as follows:

$$p^i = f(q) \quad (10)$$

By obtaining time derivative of the equation (10), a twist of the interaction frame $\Sigma i$ may be expressed by equation (11):

$$v_i = J\dot{q} \quad (11)$$

where $$J = \frac{df}{dq} \in R^{6 \times n}.$$

Based on an assumption that the interaction frame $\Sigma i$ tracks the compliant frame $\Sigma c$, the twist $v_c = v_i$ may hold true. Thus, by substitution of equation (11) into equation (1) of FIG. 1, multiplying both sides by the mapping matrix $S^T$, and using the equation (9), the generalized equation (12) may be obtained, as follows:

$$u = \widehat{K_D} \dot{q} + u_b, \text{ where} \quad (12)$$

$$\widehat{K_D} = S^T K_D J \quad (13)$$

$$u_b = S^T (K_P \Delta p_{dc} - K_D v_d) \quad (14)$$

It should be noted that the terms in the equations (12), (13), and (14) may be computed from known quantities, such as a stiffness term and a damping term due to the twist of the desired frame $\Sigma d$.

To solve equation (8), the value of $\widehat{K_{Dk}}$ and $u_{bk}$ may need to be computed by substituting the value of the mapping matrix $S^T$ in equation (13) and equation (14), respectively. The mapping matrix $S^T$ may be computed using equation (15), as follows:

$$S^T = (H^T)^+ J^T \quad (15)$$

where

*+ denotes Moore-Penrose inverse, and
$H \in R^{m \times n}$.

For the computation of the robot motion, the generalized velocity ($\dot{q}$) may be computed iteratively by minimizing the cost function of equation (6) to realize the desired admittance property. Equation (12) may not be directly utilized for the computation of the generalized velocity ($\dot{q}$) because of shortcomings, such as the mapping matrices $S^T$ and "J" may depend on the unknown location of the physical interaction, and the matrix $\widehat{K_D}$ of equation (13) may be rank deficient. In particular, the location of the physical interaction matters if the task space (such as the effector task space) is used for defining the admittance property for the robotic manipulator 204.

At 412, a set of joint control instructions may be generated. In accordance with an embodiment, the circuitry 302 of the control system 202 may be configured to generate the set of joint control instructions to control the motion of the robotic manipulator 204.

In an embodiment, the generated set of joint control instructions may be communicated as an input to the robotic manipulator 204 for AC of the robotic manipulator 204. For example, the circuitry 302 may communicate the set of joint control instructions to a joint controller, such as a Proportional-Integral-Derivative (PID) controller of the robotic manipulator 204. The joint controller may generate machine instructions or control signals to actuate at least one joint actuator of the robotic manipulator 204 based on the set of joint control instructions. In another embodiment, the circuitry 302 may include the joint controller of the robotic manipulator 204. In such a case, the circuitry 302 may directly communicate control signals for actuation of the at least one joint actuator of the robotic manipulator 204.

At 414, an initial configuration of the robotic manipulator 204 may be determined. In accordance with an embodiment, the circuitry 302 of the control system 202 may be configured to determine an initial configuration of the robotic manipulator 204. For example, the initial configuration of the robotic manipulator 204 may include an initial set of generalized coordinates of the robotic manipulator 204. The initial configuration of the robotic manipulator 204 may be determined based on measurements received from the sensor system 310 or at least one joint actuator of the robotic manipulator 204.

At 416, the initial configuration may be updated. In accordance with an embodiment, the circuitry 302 of the control system 202 may be configured to update the initial configuration of the robotic manipulator 204 based on the generated set of joint control instructions. The initial configuration of the robotic manipulator 204 may be iteratively updated based on the generated set of joint control instructions.

At 418, the motion of the robotic manipulator 204 may be controlled. In accordance with an embodiment, the circuitry 302 of the control system 202 may be configured to control the motion of the robotic manipulator 204 based on the update of the initial configuration of the robotic manipulator 204. For example, the articulated joints of the robotic arm 204A may be controlled to move (along with the effector 204B) based on the iteratively updated configuration of the robotic manipulator 204.

Although the diagram 400 is illustrated as discrete operations, such as 402, 404, 406, 408, 410, 412, 414, 416, and 418, however, in certain embodiments, such discrete operations may be further divided into additional operations, combined into fewer operations, or eliminated, depending on the particular implementation without detracting from the essence of the disclosed embodiments.

Figure 5:
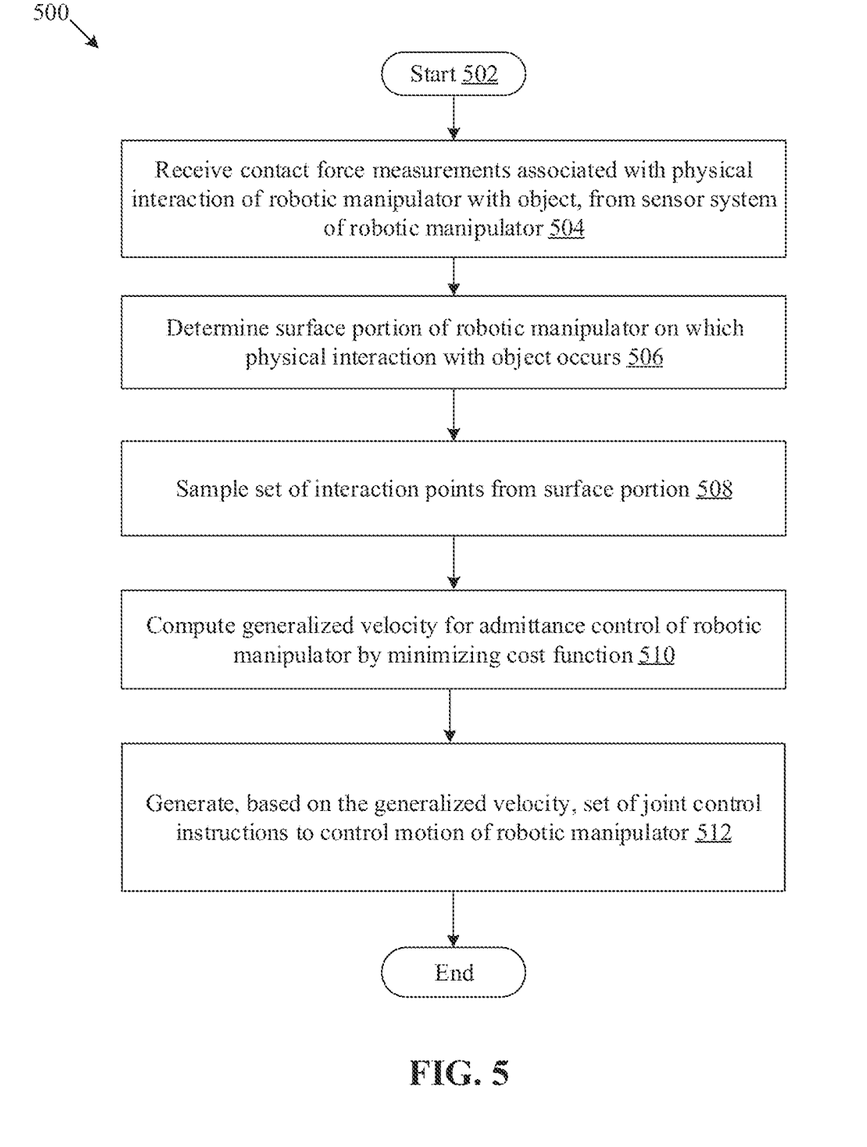
FIG. 5 illustrates a flowchart of an exemplary method for a generalized AC of a robotic manipulator, in accordance with an embodiment of the disclosure.

FIG. 5 illustrates a flowchart of an exemplary method for a generalized AC of a robotic manipulator, in accordance with an embodiment of the disclosure. FIG. 5 is explained in conjunction with elements from FIGS. 1, 2, 3, and 4. With reference to FIG. 5, there is shown a flowchart 500. The method illustrated in the flowchart 500 may start at 502 and may proceed to 504. The method illustrated in the flowchart 500 may be performed by any computing system, apparatus, or device, such as by the circuitry 302 of the control system 202.

At 504, contact force measurements associated with a physical interaction of the robotic manipulator 204 with the object 208 may be received from the sensor system 310 of the robotic manipulator 204. In at least one embodiment, the circuitry 302 of the control system 202 may be configured to receive the contact force measurements associated with the physical interaction of the robotic manipulator 204 with the object 208 from the sensor system 310 of the robotic manipulator 204. The robotic manipulator 204 may include the robotic arm 204A and the effector 204B coupled to the robotic arm 204A.

At 506, the surface portion 214 of the robotic manipulator 204 on which the physical interaction with the object 208 occurs may be determined. In accordance with an embodiment, the circuitry 302 of the control system 202 may be configured to determine the surface portion 214 of the robotic manipulator 204 on which the physical interaction with the object 208 occurs.

At 508, the set of interaction points 216 may be sampled from the surface portion. In accordance with an embodiment, the circuitry 302 of the control system 202 may be configured to sample the set of interaction points 216 from the surface portion. In FIG. 5, the determination of the surface portion at 506 and the sampling of the set of interaction points 216 at 508 are performed online (i.e. while the generalized admittance control is implemented after the contact force measurements are received at 504). However, the disclosure may not be so limiting and in some embodiments, the determination of the surface portion at 506 and the sampling of the set of interaction points 216 at 508 may be performed offline (i.e., before the generalized admittance control is applied and the contact force measurements are received at 504. This may be done because surface or shape information of the robotic manipulator 204 may be known to the control system 202 in advance.

At 510, the generalized velocity for the AC of the robotic manipulator 204 may be computed. In at least one embodiment, the circuitry 302 of the control system 202 may be configured to compute the generalized velocity for the AC of the robotic manipulator 204. The generalized velocity may be computed by minimizing the cost function which includes the relationship between the received contact force measurements and an approximation term which models the application of an actual contact force of the physical interaction on the sampled set of interaction points 216.

At 512, the set of joint control instructions to control the motion of the robotic manipulator 204 may be generated, based on the generalized velocity. In at least one embodiment, the circuitry 302 of the control system 202 may be configured to generate the set of joint control instructions to control the motion of the robotic manipulator 204, based on the generalized velocity. Control may pass to end.

The flowchart 500 is illustrated as discrete operations, such as 504, 506, 508, 510, and 512. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, computer-executable instructions that when executed by a control system such as the control system 202, causes the control system 202 to execute operations. The operations may cause the machine and/or computer to perform operations that may include receiving, from a sensor system (such as the sensor system 310) of a robotic manipulator (such as the robotic manipulator 204), contact force measurements associated with a physical interaction of the robotic manipulator 204 with an object (such as the object 208). The operations may further include determining a surface portion of the robotic manipulator 204 on which the physical interaction with the object 208 occurs. Furthermore, the operations may include sampling a set of interaction points (such as the set of interaction points 216) from the surface portion. Moreover, the operations may include computing a generalized velocity for an AC of the robotic manipulator 204. The generalized velocity may be computed by minimizing a cost function comprising a relationship between the received contact force measurements and an approximation term which models an application of an actual contact force of the physical interaction on the sampled set of interaction points 216. The operations may further include generating, based on the generalized velocity, a set of joint control instructions to control a motion of the robotic manipulator 204.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present.

Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A control system, comprising:
   circuitry communicatively coupled to a robotic manipulator that comprises a robotic arm and an effector coupled to the robotic arm, wherein the circuitry is configured to:
   receive, from a sensor system of the robotic manipulator, contact force measurements associated with a physical interaction of the robotic manipulator with an object;
   determine a surface portion of the robotic manipulator on which the physical interaction with the object occurs;
   sample a set of interaction points from the surface portion;
   compute a generalized velocity for an admittance control of the robotic manipulator,
     the generalized velocity is computed by minimizing a cost function comprising a relationship between the received contact force measurements and an approximation term which models an application of an actual contact force of the physical interaction on the sampled set of interaction points; and
   generate, based on the generalized velocity, a set of joint control instructions to control a motion of the robotic manipulator.

2. The control system according to claim 1, wherein the sensor system comprises one or more of:
   a joint torque sensor coupled to each joint of a plurality of joints of the robotic arm,
   a first force-torque sensor coupled to the effector, and
   a second force-torque sensor coupled to a base of the robotic manipulator.

3. The control system according to claim 2, wherein the received contact force measurements comprises one or more of:
   a set of joint torque measurements acquired from the joint torque sensor coupled to each joint of the plurality of joints of the robotic arm,
   a first set of force-torque measurements acquired from the first force-torque sensor, and
   a second set of force-torque measurements acquired from the second force-torque sensor.

4. The control system according to claim 1, wherein the relationship corresponds to a weighted sum-of-squared-difference (WSSD) between the received contact force measurements and the approximation term.

5. The control system according to claim 1, wherein the circuitry is further configured to:
   compute a force value of interaction at each interaction point of the sampled set of interaction points by minimizing an error with the received contact force measurements; and
   compute, based on the minimized error, a weight value of a set of weight values for each interaction point of the sampled set of interaction points.

6. The control system according to claim 5, wherein the cost function is minimized further based on the computed set of weight values.

7. The control system according to claim 5, wherein
   a first weight value of the set of weight values indicates a likelihood that a first interaction point of the sampled set of interaction points is proximal to a location of the physical interaction on the robotic manipulator, and
   the first weight value is higher than a second weight value for a second interaction point if the first interaction point is closer to the location of the physical interaction than the second interaction point.

8. The control system according to claim 1, wherein the set of interaction points is sampled based on at least one of: a type of the physical interaction of the object with the robotic manipulator, a geometry of the object, or a geometry of the surface portion of the robotic manipulator.

9. The control system according to claim 1, wherein the circuitry is further configured to:
iteratively update, based on the generated set of joint control instructions, an initial configuration of the robotic manipulator, wherein the initial configuration comprises an initial set of generalized coordinates of the robotic manipulator; and
control the motion of the robotic manipulator based on the update.

10. A method, comprising:
in a control system communicatively coupled to a robotic manipulator:
receiving, from a sensor system of a robotic manipulator, contact force measurements associated with a physical interaction of the robotic manipulator with an object, the robotic manipulator comprising a robotic arm and an effector coupled to the robotic arm;
determining a surface portion of the robotic manipulator on which the physical interaction with the object occurs;
sampling a set of interaction points from the surface portion;
computing a generalized velocity for an admittance control of the robotic manipulator,
the generalized velocity is computed by minimizing a cost function comprising a relationship between the received contact force measurements and an approximation term which models an application of an actual contact force of the physical interaction on the sampled set of interaction points; and
generating a set of joint control instructions to control a motion of the robotic manipulator, based on the generalized velocity.

11. The method according to claim 10, wherein the sensor system comprises one or more of:
a joint torque sensor coupled to each joint of a plurality of joints of the robotic arm,
a first force-torque sensor coupled to the effector, and
a second force-torque sensor coupled to a base of the robotic manipulator.

12. The method according to claim 11, wherein the received contact force measurements comprises one or more of:
a set of joint torque measurements acquired from the joint torque sensor coupled to each joint of the plurality of joints of the robotic arm,
a first set of force-torque measurements acquired from the first force-torque sensor, and
a second set of force-torque measurements acquired from the second force-torque sensor.

13. The method according to claim 10, wherein the relationship corresponds to a weighted sum-of-squared-difference (WSSD) between the received contact force measurements and the approximation term.

14. The method according to claim 10, further comprising:
computing a force value of interaction at each interaction point of the sampled set of interaction points by minimizing an error with the received contact force measurements; and
computing, based on the minimized error, a weight value of a set of weight values for each interaction point of the sampled set of interaction points.

15. The method according to claim 14, wherein the cost function is minimized further based on the computed set of weight values.

16. The method according to claim 14, wherein
a first weight value of the set of weight values indicates a likelihood that a first interaction point of the set of interaction points is proximal to a location of the physical interaction on the robotic manipulator, and
the first weight value is higher than a second weight value for a second interaction point if the first interaction point is closer to the location of the physical interaction than the second interaction point.

17. The method according to claim 10, wherein the set of interaction points is sampled based on at least one of: a type of the physical interaction of the object with the robotic manipulator, a geometry of the object, or a geometry of the surface portion of the robotic manipulator.

18. The method according to claim 10, further comprising:
iteratively updating, based on the generated set of joint control instructions, an initial configuration of the robotic manipulator, wherein the initial configuration comprises an initial set of generalized coordinates of the robotic manipulator; and
controlling the motion of the robotic manipulator based on the update.

19. A non-transitory computer-readable medium having stored thereon, computer-executable instructions that when executed by a control system, causes the control system to execute operations, the operations comprising:
receiving, from a sensor system of a robotic manipulator, contact force measurements associated with a physical interaction of the robotic manipulator with an object,
determining a surface portion of the robotic manipulator on which the physical interaction with the object occurs;
sampling a set of interaction points from the surface portion;
computing a generalized velocity for an admittance control of the robotic manipulator,
the generalized velocity is computed by minimizing a cost function comprising a relationship between the received contact force measurements and an approximation term which models an application of an actual contact force of the physical interaction on the sampled set of interaction points; and
generating, based on the generalized velocity, a set of joint control instructions to control a motion of the robotic manipulator.

20. The non-transitory computer-readable medium according to claim 19, wherein the relationship corresponds to a weighted sum-of-squared-difference (WSSD) between the received contact force measurements and the approximation term.

* * * * *